Dec. 6, 1932.  J. NELSON  1,889,998
CLUTCH
Filed June 6, 1931  3 Sheets-Sheet 1
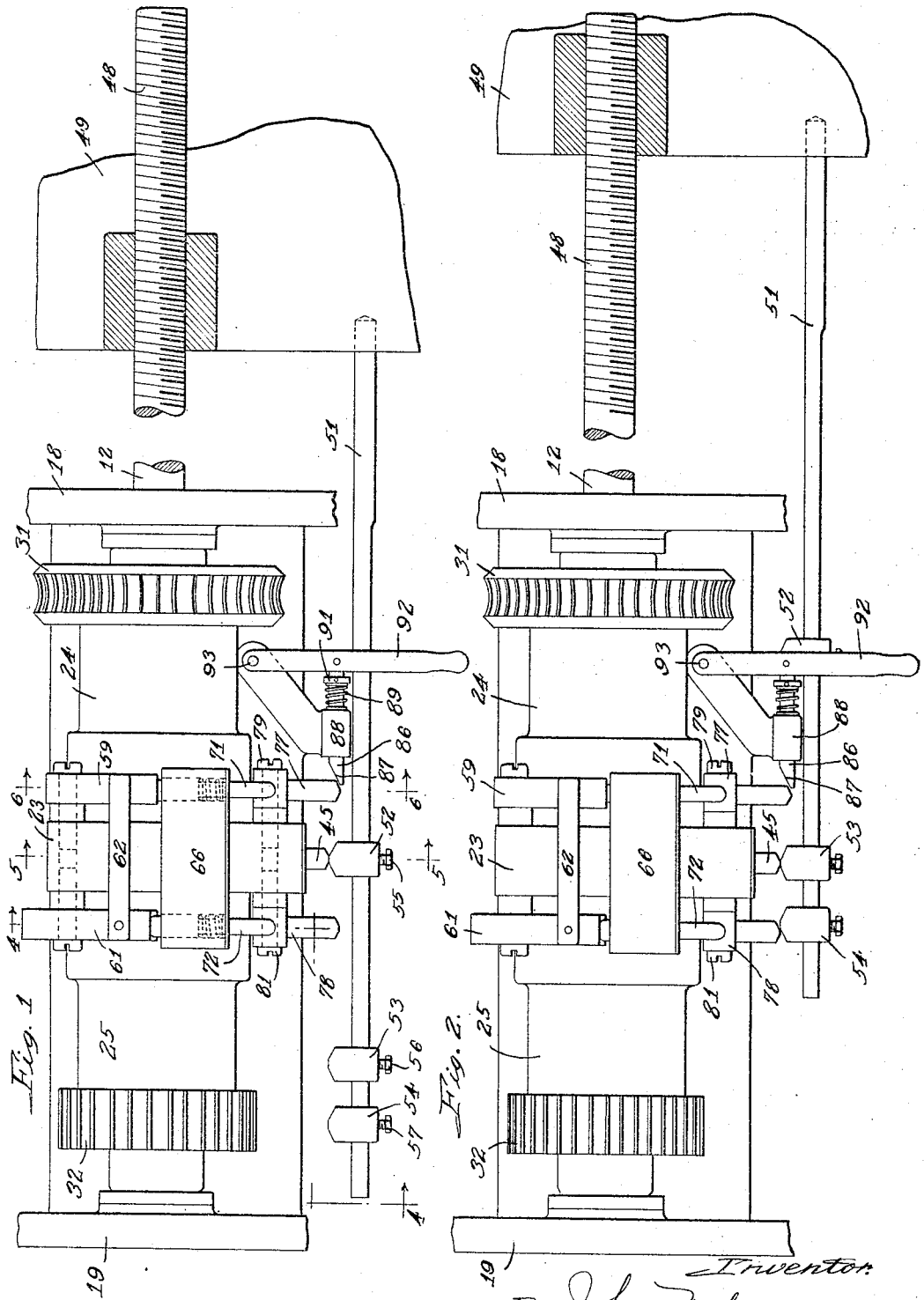

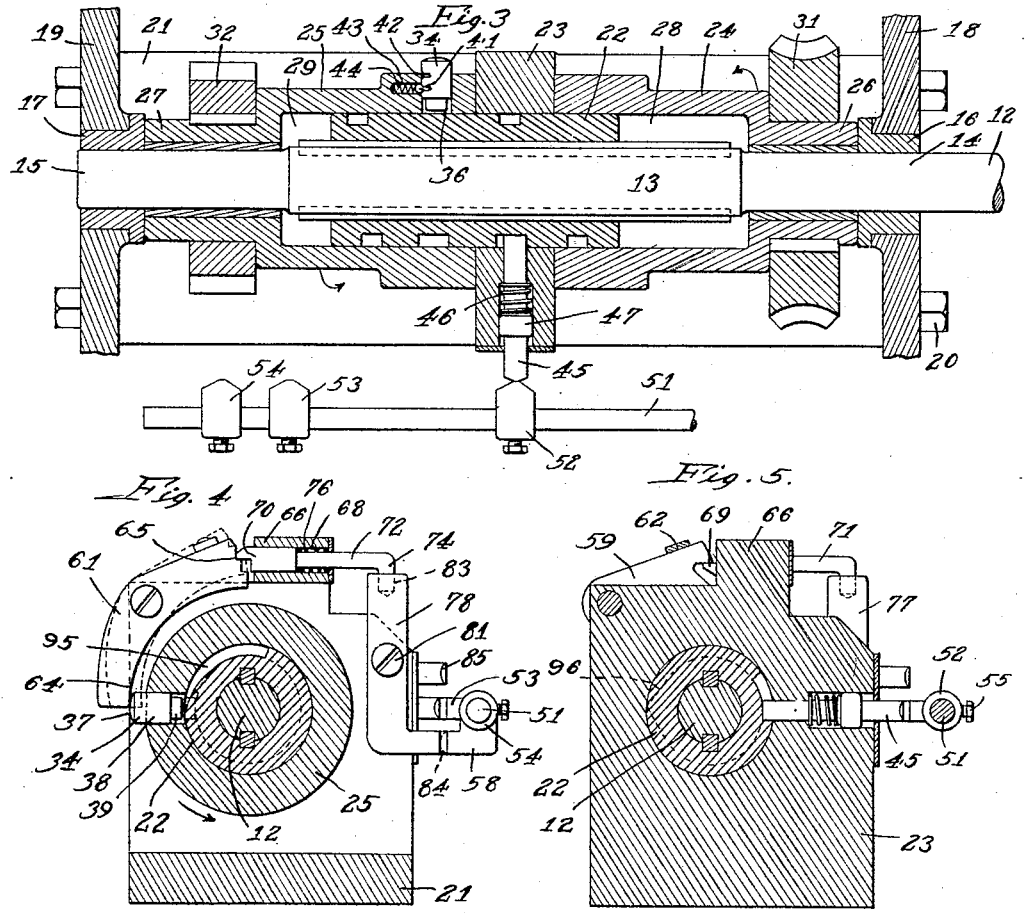
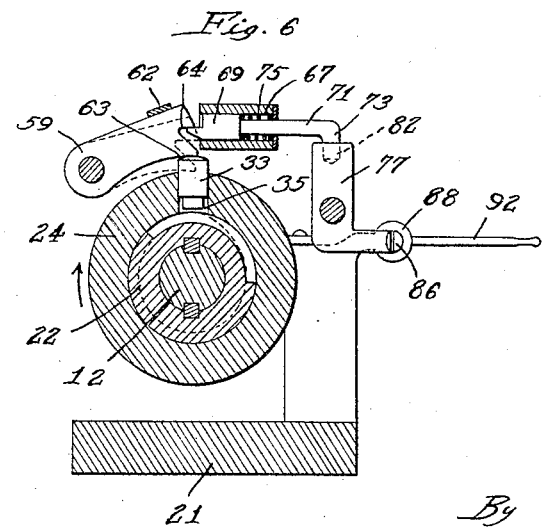

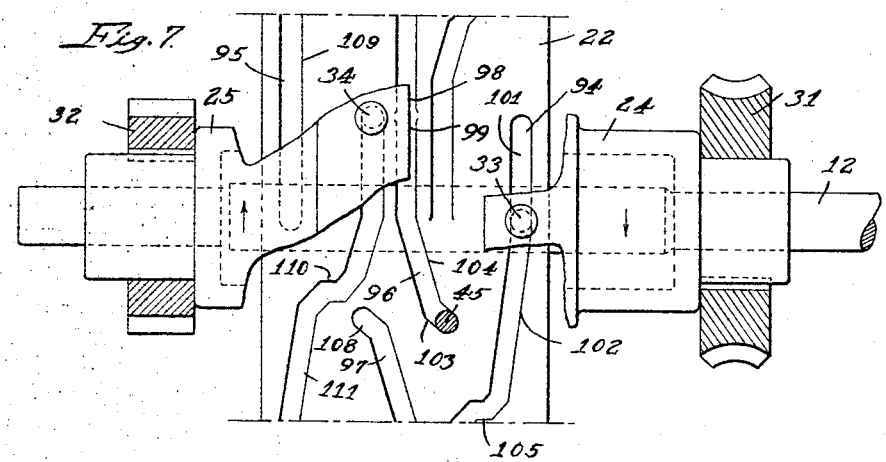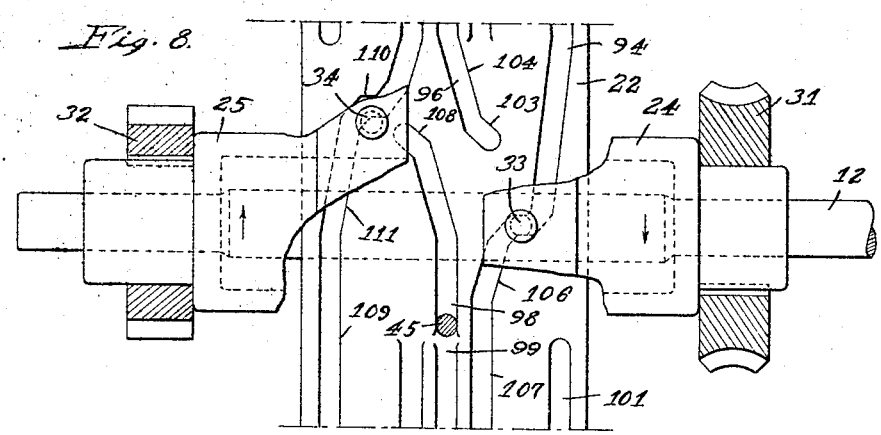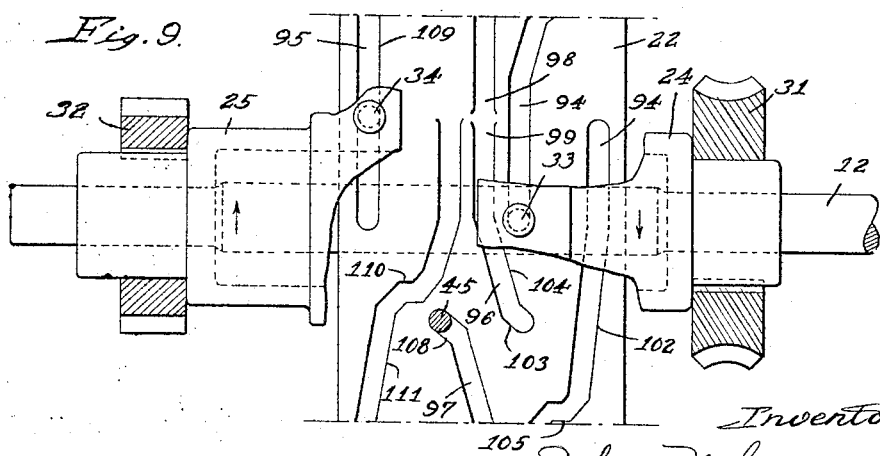

Patented Dec. 6, 1932

1,889,998

UNITED STATES PATENT OFFICE

JOHN NELSON, OF CHICAGO, ILLINOIS, ASSIGNOR OF ONE-HALF TO BENGT GRANBERG, OF ROCKFORD, ILLINOIS

CLUTCH

Application filed June 6, 1931. Serial No. 542,473.

This invention relates to clutches and has special reference to a clutch particularly adapted for use in driving the carriage or tool slide of machine tools such as milling machines, lathes, shapers and the like though not limited thereto.

On production machinery having a closed cycle, that is, simple feed and return movements, it is desirable to have the carriage power driven in both movements and in many instances to provide a slow feed and a rapid return. These movements have in the past been customarily accomplished through the use of either a cam drive, a rack drive or a screw drive. Each of these drives are subject to certain inherent disadvantages. The cam drive for example, while it gives accurate stoppage of the carriage, provides only a fixed stroke, a new cam being necessary for each separate stroke. On the other hand, the rack or screw drive permits of a variable stroke but does not give accuracy.

I have, therefore, aimed to provide a clutch mechanism from which both accuracy and variable stroke of the carriage may be had.

Another object of the invention is the provision of a clutch mechanism giving rapid acceleration and deceleration of the carriage and a stroke of variable length.

Another object of the invention is the provision of a clutch mechanism having the advantages of both the cam and the rack drive without the disadvantages characteristic of either.

I have also aimed to provide a clutch mechanism wherein all of the changes in speed and direction are smooth and without shock.

Another object of the invention is the provision of a clutch mechanism which may be manufactured as a self-contained unit of small size.

A still further and important object of the invention is the provision of a clutch mechanism which may be manufactured at substantially smaller cost than heretofore.

Other objects and attendant advantages will become apparent to those skilled in the art from the following description and the accompanying drawings, in which—

Figure 1 is a plan view of a clutch embodying my invention showing a carriage or tool slide in fragmentary diagrammatic form with the cam pin actuating mechanism in a position to cause the carriage to dwell;

Fig. 2 is a plan view of my invention similar to Fig. 1 showing the cam pin actuating mechanism in a position to bring about return of the carriage;

Fig. 3 is a sectional plan with the parts in the position shown in Figure 1;

Fig. 4 is a section substantially on the line 4—4 of Figure 1;

Fig. 5 is a section on the line 5—5 of Figure 1;

Fig. 6 is a section on the line 6—6 of Figure 1; and

Figs. 7, 8 and 9 are diagrammatic views of the clutch mechanism showing the cam sleeve and cam pin cylinders rolled out.

In a general way, the invention contemplates the provision of a cam member having a plurality of cam grooves adapted to be engaged by cam pins positioned in members driven in opposite directions or the same direction at different speeds, the cam grooves being so arranged that when engaged by one or more of the pins the cam will be progressively increased in speed, then maintain at the speed of the driving member, and finally through the actuation of simple mechanism progressively decelerated to zero. The invention also contemplates the provision of mechanism for driving a shaft in either direction at different rates of speed, if desired, and means for automatically stopping and reversing the motion of the shaft with the motion of the mechanism driven thereby.

I have shown in the present embodiment a shaft having a splined portion upon which is positioned a sleeve provided with suitable cam grooves though other arrangements may be satisfactorily used. A central stationary member is provided about the cam sleeve and within which the cam sleeve has bearing contact. On either side of the stationary member oppositely driven pin cylinders surround the sleeve, each cylinder having a cam pin adapted to be inserted in suitable cam grooves to drive the cam cylinder and shaft in opposite directions. A pin in the stationary member is arranged to be inserted in a cam groove to disconnect either of the other cam pins to bring the sleeve and shaft to a stop. Means are provided on the carriage for automatically actuating the cam pins at desired intervals and manually operable means serves to start the mechanism upon its cycle.

Referring now to the drawings, a shaft 12 is provided with a splined portion 13 and spaced bearing portions 14 and 15, the shaft being rotatably supported in suitable bearings 16 and 17 positioned in opposite sides 18 and 19 of a frame member 21. The sides 18 and 19 are removably held to the frame by bolts 20 for assembling and disassembling. A cam sleeve 22, having on the outer side thereof cam grooves presently to be described more in detail, is slidably positioned on the splined portion 13. A stationary member 23, which may be a part of the frame 21 or may be otherwise fixed against movement, is provided with a cylindrical opening to slidably and rotatably receive the cam sleeve 22, the cam sleeve having bearing contact with the stationary member, as best shown in Fig. 3. Cam pin cylinders 24 and 25 surround the cam sleeve 22 on either side of the stationary portion 23 and are provided at their ends with cylindrical bearings 26 and 27 adapted to receive the portions 14 and 15 of the shaft 12, the cylinders being spaced from the shaft, as shown at 28 and 29, to permit the cam sleeve 22 to move longitudinally on the splined portion 13 of the shaft. Gears 31 and 32 are keyed to the portions 26 and 27 of the cam pin cylinders and serve to rotate the cylinders independently of the shaft 12. The gears in this case comprise a spur gear 32 and a worm gear 31 but it will be understood that various types of gears may be employed depending upon the particular service to which the clutch is to be placed. Cam pins 33 and 34 are positioned in openings 35 and 36 in the cylinders 24 and 25 and are of identical shape and design. Each of these pins is provided with an arcuate head 37, a cylindrical body 38 adapted to closely fit the opening in the cylindrical cam following end 39 adapted to be received in the cam grooves. The pins are provided with two seats 41 and 42 against which a ball detent 43 is pressed by means of a spring 44 to maintain the pins in either of two desired positions and permit them to be moved between these positions by pressure applied to the ends of the pins. A cam pin 45 is positioned in the station member 23 whereby the inner end thereof may be forced into a cam groove in the sleeve 22. A spring 46 bearing against a collar 47 on the pin serves to constantly urge the pin outward as a result of which the pin will remain disengaged from the cam groove except when positively inserted therein by extraneous means.

Referring now to Figs. 1 and 2, the shaft 12 is connected either directly or through gearing or supplemental devices to a screw 48 of conventional design adapted to drive a carriage designated generally by the numeral 49 of a machine tool mechanism such, for example, as a milling machine, lathe, or the like, the screw 48 serving to move the carriage to the right or left, facing these figures, through rotation of the shaft 12. A rod 51 is secured to the carriage 48 and projects backward in parallel spaced relation to the clutch mechanism and is arranged to support dogs 52, 53 and 54 for longitudinal adjustment thereon by means of set screws 55, 56 and 57. The dogs 52 and 53 are arranged to project horizontally inward, as shown in Figs. 4 and 5, while the dog 54 is provided with an offset portion 58 whereby the end thereof projects inward in a lower longitudinal plane than that of the dogs 52 and 53. Movement of the carriage 49 in feed and return motion carries with it the rod 51 and the dog supported thereon which, by this movement, are brought into contact with intermediate mechanism adapted to serve in actuating the cam pins to stop the motion of the shaft 12 and bring about reverse motion thereof.

This mechanism includes a pair of pawls 59 and 61 pivotally secured to opposite sides of the stationary member 23, a flat spring 62 extending across the back of the two pawls. The pawl 59 is provided with a contacting surface at 63 and the pawl 61 with a contacting surface at 64 adapted to bear against the pins when the pawls occupy the dotted line positions shown in Figs. 4 and 6. The pawl 59 is provided with a shoulder 64 by which it may be maintained in the full line position shown in Fig. 6 during the normal rotation of the cylinder 24 so as not to come in contact with the cam pin 33. In like manner, the pawl 61 is provided with a shoulder 65 whereby the pawl may be normally maintained out of contact with the pin 34 during the rotation of the cylinder 25. A bar 66 is secured to the top of the stationary member 23 and is provided at opposite ends with openings 67 and 68 adapted to slidably hold detent members 69 and 70 having faces arranged to cooperate with the shoulders 64 and 65 of the pawls. Fingers 71 and 72, having downwardly extending ends 73 and 74 are secured to one end of the detent members 69 and 70 adapted to be employed in moving the detent members to the unlatched position. Springs 75 and 76 act to return the detent members to their projected positions. Bell crank levers 77 and 78 are pivotally secured to opposite sides of the stationary member 23 by means of cap screws 79 and 81 and are provided with sockets 82 and 83 at their upper ends to receive the downturned ends 73 and 74. The opposite ends of the bell crank levers 77 and 78 are provided with beveled faces 84 and 85 adapted to cooperate with the dog 54 and with a manual starting mechanism presently to be described.

This manual starting mechanism consists of a rod 86 having a beveled end 87, the rod being slidably positioned in a bearing 88 on the frame 21. A spring 89 acts between the bearing 88 and a collar 91 on the rod to normally maintain the latter in its retracted position. A handle 92 is pivotally secured to the frame 21 at 93 and is adapted to bear against the end of the rod 86 whereby the latter may be projected outward rotating the bell crank lever 77 against the action of the spring 75 to release the pawl 59 from the full line position shown in Fig. 6 to permit it to move to the dotted line position shown in this figure under the action of the spring 62.

Manual movement of the handle 92 releases the pawl 59 in the manner just described, whereby the cam pin 33 is forced into the cam slot to bring about rotation of the cam sleeve 22 in the direction of rotation of the cylinder 24, as will presently be described. Rotation of the cam sleeve 22 brings about rotation of the shaft 12 and in turn of the feed screw 48 thereby causing the carriage 49 to move from the position shown in Fig. 1 to the position shown in Fig. 2. As the carriage approaches the position shown in Fig. 2 the dog 53 comes into contact with the cam pin 45 forcing it into a cam slot, as shown in Fig. 2. This causes the cam pin 33 to be disengaged from the cam sleeve 22 and brings the carriage 49 to a stop, as will be subsequently described. Contact of the dog 54 with the lever 78 to release the pawl 61 and insert the cam pin 34 which brings about engagement of the cylinder 25 with the cam sleeve 22, thus rotating the shaft 12 and the feed screw 48 in the opposite direction to return the carriage from the position shown in Fig. 2 to the position shown in Fig. 1.

Referring now to Figs. 7, 8 and 9, the cam sleeve 22 has been developed to show the curvature and the relationship of the cam grooves. These consist of four grooves, a groove 94 is arranged along one end of the cam sleeve 23 circumferentially thereof and has the curvature and shape shown in Figs. 7-9, inclusive. This groove is adapted to receive a cam pin 33 to drive the sleeve in the direction of rotation of the cam pin cylinder 24. A cam groove 95 is circumferentially arranged on the cam sleeve 22 near the opposite end thereof and is adapted to receive the cam pin 34 to drive the sleeve 22 in the direction of rotation of the cylinder 25. A cam slot 96 is arranged to receive the cam pin 45 to longitudinally move the cam sleeve 22 whereby to permit the cam pin 34 to ride out of one end of the cam slot 95 while the cam groove 97 is arranged to receive the cam pin 45 to cause the sleeve to move longitudinally whereby the cam pin 33 will be caused to ride out of one end of the cam slot 94. The bottoms of the cam slots 94 and 95 are caused to slope upwardly at the ends of these slots whereby the cam pins 33 and 35 will be forced out of the cam pins when brought to these points by rotation of the parts. The ends 98 and 99 of the cam slots 96 and 97 also end on the surface of the sleeve 22 whereby the cam pin 45 will be moved to its outer position when brought opposite these points.

In operation, the cylinders 24 and 25 will normally be driven through the gears 31 and 32 in opposite directions, as indicated by the arrows. When the shaft 12 is stationary the cam pin 45 will occupy the position shown in Fig. 7 at the end of the groove 96 at which point it bears against a shoulder forming the end of the groove. Pins 33 and 34 will then occupy the full line position shown in Figs. 4 and 6. In this view the parts are in a position wherein the cam pin 33 is receivable in the cam slot 94 for the purpose of driving the carriage 49 from the position shown in Fig. 1 to the position shown in Fig. 2. In order to start such movement the operator will move the handle 92 to the left, facing Figs. 1 and 2, thereby retracting the detent 69 to permit the bearing surface 63 of the pawl 59 to come in contact with the cam pin 33. Rotation of the cylinder 24 will then bring the cam pin 33 against the bearing surface 63 to force it into the portion of the cam groove 94, designated by the numeral 101, as shown in Fig. 7. Rotation of the cylinder 24 will cause the cam pin to move along the diagonal line portion 102 of the cam groove 94 at the same time laterally moving the cam sleeve 22 to the right facing Fig. 7 to bring the cam pin 45 along the diagonal portions 103 and 104 of the groove 96. As the rotation of the cylinder 24 continues the parts will be brought into the position shown in Fig. 8 with the cam pin 33 bearing against the longitudinal face 105 of the groove 94. At this point the cam pin 45 will have been forced out of the groove 96 and the sleeve 92 will be driven by the cylinder 24 through contact of the cam pin 33 against the face 105. During the following period the shaft 12 and the sleeve 22 will be rotated by the cylinder 24 at the same speed. During this period the carriage 49 will be moving into the position shown in Fig. 2. When the carriage reaches the end of its stroke the dog 53 will be brought into contact with the pin 45 forcing it into the cam groove 97. As this pin enters the groove 97 the sleeve 22 will be moved to the right, facing Fig. 8, thus bringing the cam pin 33 over the face 105 of the groove 94 and along the inclined portions 106 and 107 of the cam groove 94. When the cam pin 33 occupies the position shown in Fig. 9 the cam pin 45 will be at the end of the cam slot 97 preventing further rotation of the sleeve 22. At this point the sloping bottom of the cam groove 94 will have forced the pin 33 to the surface of the cam sleeve 22 back into the position shown in Fig. 6, thereby moving the pawl 59 back to the full line position shown in this figure at which point the detent 69 will again engage the shoulder 64 to hold the pawl.

Simultaneously with the contact of the dog 53 with the cam pin 45, the dog 54 comes into contact with the end 84 of the lever 78, retracting detent 70 and bringing the bearing surface 64 of the pawl 61 in contact with the cam pin 34. This movement of the pawl 61 will be brought about by the spring 62 since this spring is loaded when the pawl 59 is brought into the solid line position shown in Fig. 6. Consequently when the sleeve 22 is rotated it will be moved to the right by movement of the groove with respect to the pin 45 along the diagonal portion 108 of the cam groove 97 bringing the cam pin 34 into registration with the portion 109 of the cam slot 95 whereupon the pin will be forced into the groove by the pawl 61 upon rotation of the cylinder 25. Movement of the sleeve 22 to bring the cam pin 34 against the shoulder 110 of the cam slot 95 is identical with that previously described for the cam pin 33 and at this time the cam pin 45 will be forced out of the groove 97 at 98. During the following interval the shaft 12 will rotate in the direction of rotation of the cylinder 25 until the dog 52 comes into contact with the cam pin 45 at which point the cam pin 34 will be moved away from the longitudinal portion 110 to stop the rotation of the shaft 12 as previously described.

It will be seen that by suitably arranging the shape characteristics of the cam grooves, movements of various characteristics may be had. For example, the inclination of the grooves may be arranged to give any desired rate of acceleration or deceleration. It will be seen that upon engagement of the cam pins the rotation of the cylinders 24 and 25 is not substantially imparted to the shaft 12 but, because of the inclination and shape characteristics of the cam grooves this motion is gradually picked up from zero to the full speed of either the cylinder 24 or 25. In like manner, when the cam pin 45 is inserted the rotation is gradually decelerated from the full speed of the cylinder to zero.

The manifold advantages of my improved clutch will doubtless have become apparent. It will be seen that by simply moving the dogs 52, 53 and 54 any desired stroke of the carriage 49 may be had. In this way I have combined the advantages of the customary cam feed and of the rack or screw feed. An important feature of the invention is the fact that the carriage 49 will be caused to stop at identically the same place at each cycle which permits the mechanism to be used where the maintenance of close limits is essential. The device results in the accuracy of a cam operated carriage and provides the variable stroke of a rack or screw operated carriage.

An important feature of the invention lies in the fact that the movement of the carriage is gradually increased from zero to full speed and decreased from full speed gradually to zero during the starting and stopping of the carriage. This results in a very smooth operating carriage which may be started and stopped without shock of any kind.

A further feature of the invention is the fact that special means for reversing the rotation of the shaft to return the carriage is eliminated, the device providing, without special equipment, means for producing a slow, smooth feed and a smooth rapid return.

While I have thus described and illustrated a specific embodiment of this invention I am aware that numerous alterations and changes may be made without materially departing from the spirit of the invention and the scope of the appended claims, in which—

I claim:

1. A clutch comprising in combination, a driven shaft, at least two driving members, an intermediate member on said shaft having driving engagement therewith, and cam means operable between said intermediate member and either of said driving members for transmitting a continuous driving force to said shaft.

2. A clutch comprising in combination, a driven shaft, at least two driving members, an intermediate member on said shaft having driving engagement therewith, and cam means operable between said intermediate member and either of said driving members for accelerating said shaft to the full speed of said driving member, driving said shaft, and decelerating the speed of said shaft to zero.

3. A clutch comprising in combination, a driven shaft, at least two driving members, an intermediate member on said shaft having driving engagement therewith, a stationary member, cam means operable between said intermediate member, said stationary member, and either of said driving members for progressively bringing said intermediate member and said driving member into driving engagement, holding said members in driving engagement and progressively bringing them out of driving engagement to impart to said shaft, positive acceleration, positive driving at the speed of said driving member, and positive deceleration, and means acting between said stationary member and said intermediate member operable in starting and stopping the rotation of said shaft.

4. In a clutch, the combination of a driven shaft, at least two driving members, an intermediate member on said shaft having driving engagement therewith, a stationary member, and cam means comprising a cam slot and pin construction operable between said intermediate member, said stationary member and either of said driving members for progressively bringing said intermediate member and said driving member into driving engagement, holding said member in driving engagement and progressively bringing them out of engagement and stopping the rotation of said shaft, to impart to said shaft, positive acceleration, positive driving at the speed of said driving member, and positive deceleration.

5. A clutch comprising in combination, a driven shaft, at least two driving members coaxially and rotatably positioned on said shaft, an intermediate member coaxially positioned on said shaft and having driving connection therewith, and a pin and cam slot connection between said driving members and said intermediate member to provide driving connection between said intermediate member and either of said driving members to alternately drive said shaft from either of said driving members.

6. A clutch comprising, in combination, a driven shaft, a cam sleeve splined to said shaft, at least one cylindrical driving member concentric with said sleeve, and means on said driving member for engagement with said cam sleeve to drive said shaft from said driving member.

7. A clutch comprising in combination, a driven shaft, a cam sleeve splined to said shaft and having a plurality of cam grooves, a stationary member adjacent to said cam sleeve, at least two driving members concentric with said cam sleeve, cam pins in said stationary member and each of said driving members adapted to move between retracted positions and projected positions engaging said cam slots, said slots being positioned and shaped to receive said cam pins to rotate said shaft in positive acceleration, and deceleration movements from either of said driving members.

8. A clutch comprising in combination, a driven shaft, a cam sleeve splined to said shaft and having a plurality of cam grooves, a stationary member adjacent to said cam sleeve, at least two driving members having rotary motion around said sleeve, means on each of said driving members for engaging one of said cam slots to rotate said shaft in positive acceleration, drive, and deceleration movements from either of said driving members, and means on said stationary member for engaging at least one cam groove for stopping rotation of said shaft and disengaging said last mentioned means, whereby said shaft is selectively driven from either of said driving members.

9. A clutch comprising in combination, a driven shaft, a cam sleeve splined to said shaft and having a plurality of cam grooves, a stationary member adjacent to said cam sleeve, at least two driving members concentric with said cam sleeve, cam pins in said stationary member and each of said driving members adapted to move between retracted positions and projected positions engaging said cam slots, said slots being positioned and shaped to receive said cam pins to rotate said shaft in positive acceleration, drive, deceleration movements from either of said driving members, and means for inserting said cam pins during the rotation of said driving members.

10. In a clutch adapted to drive the carriage of a tool, a driven shaft operatively connected to said carriage, a cam sleeve splined to said shaft and having a plurality of cam grooves, a stationary member adjacent to said cam sleeve, at least two driving members having rotary motion around said sleeve, cam pins in said stationary member and each of said driving members supported to move between retracted positions and projected positions engaging said cam grooves, said grooves being positioned and shaped to receive said cam pins to rotate said shaft in positive acceleration, drive, and deceleration movements from either of said driving members, and means on said carriage for automatically inserting the cam pin in said stationary member to disengage the cam pins in said driving members and stop the rotation of said shaft.

11. In a clutch adapted to drive the carriage of a tool, a driven shaft operatively connected to said carriage, at least two driving members having rotary motion around said sleeve, a cam sleeve splined to said shaft and having a plurality of cam grooves, a stationary member adjacent to said cam sleeve, at least two driving members having rotary motion around said sleeve, cam pins in said stationary member and each of said driving members supported to move between retracted positions and projected positions engaging said cam slots, said slots being positioned and shaped to receive said cam pins, to rotate said shaft in positive acceleration, drive, and deceleration movements from either of said driving members, and means actuated from said carriage for inserting at least a portion of said cam pins in timed relation.

12. In a clutch adapted to drive the carriage of a tool, a driven shaft operatively connected to said carriage, at least two driving members having rotary motion around said sleeve, a cam sleeve splined to said shaft and having a plurality of cam grooves, a stationary member adjacent to said cam sleeve, at least two driving members having rotary motion around said sleeve, cam pins in said stationary member and each of said driving members supported to move between retracted positions and projected positions engaging said cam slots, said slots being positioned and shaped to receive said cam pins to rotate said shaft in positive acceleration, drive, and deceleration movements from either of said driving members, manually operable means for inserting the cam pin in said stationary member, and means for inserting the cam pins of said driving members comprising spring actuated levers arranged to move said pins through contact with the ends thereof, and means for holding said levers in an inoperative position and releasing them to move to an operative position to insert said cam pins into said cam grooves.

13. The combination in a clutch of a shaft, at least two cylindrical driving members axially positioned with respect to said shaft, a cam pin in each of said driving members supported for movement between a projected position with the end thereof projecting from the wall of said driving members and a retracted position, a sleeve within said driving members splined to said shaft, said sleeve having driving cam grooves equal in number to said driving members and at least one stopping groove, a stationary member, a stopping cam pin supported in said stationary member for movement between a retracted position and a projected position engaging said stopping groove, said grooves being shaped and positioned for the pin of either of said driving members and said stopping pin to be simultaneously received in said grooves to move said sleeve longitudinally and rotate said sleeve to accelerate and decelerate said shaft and for one of said pins to be forced to the retracted position to rotate said sleeve and shaft at the speed of said driving member or hold the same stationary.

14. A clutch comprising in combination, a driven shaft, at least two driving members, a stationary member adjacent to said shaft, driving cam pins in each of said driving members, and a stopping cam pin in said stationary member, and a sleeve splined to said shaft having separate cam grooves for each of said driving members shaped to receive said driving cam pins and to provide shaft accelerating portions, shaft driving portions and shaft decelerating portions, and at least one cam groove arranged to hold said stopping cam pin during the acceleration and deceleration of said shaft, and to stop rotation of said shaft, said pins being forced from said cam grooves by the inclination of the bottom of said cam grooves.

15. A clutch comprising in combination, a driven shaft, at least two driving members, a stationary member adjacent to said shaft, driving cam pins in each of said driving members, and a stopping cam pin in said stationary member, and a sleeve splined to said shaft having separate cam grooves for each of said driving members shaped to receive said driving cam pins and to provide shaft accelerating portions, shaft driving portions and shaft decelerating portions, and at least one cam groove arranged to hold said stopping cam pin while said driving pins are in said shaft accelerating and decelerating portions of said cam grooves to control the longitudinal movement of said sleeve and stop rotation of said shaft.

16. A clutch comprising in combination, a driven shaft, at least two driving members, a stationary member adjacent to said shaft, driving cam pins in each of said driving members, and a stopping cam pin in said stationary member, and a sleeve splined to said shaft having circumferentially positioned cam grooves for each of said driving members positioned to receive said driving cam pins, portions of said grooves being diagonally positioned to provide shaft accelerating and shaft decelerating portions, and portions being axially positioned on the surface of said sleeve to provide shaft driving portions, and at least one cam groove arranged to hold said stopping cam pin during the acceleration and deceleration of said shaft, and to stop rotation of said shaft, said pins being forced from said cam grooves by the inclination of the bottom of said cam grooves.

17. A clutch comprising in combination, a driven shaft, at least two driving members, a stationary member adjacent to said shaft, driving cam pins in each of said driving members, and a stopping cam pin in said stationary member, and a sleeve splined to said shaft having circumferentially positioned cam grooves for each of said driving members positioned to receive said driving cam pins, portions of said grooves being diagonally positioned to provide shaft accelerating and shaft decelerating portions, and portions being axially positioned on the surface of said sleeve to provide shaft driving portions, and cam grooves positioned to receive said stopping cam pin at each driving position of said sleeve comprising circumferentially disposed grooves each having an end providing a shoulder and an end running out at the surface of said sleeve, said grooves serving to hold said stopping cam pin to shift said sleeve longitudinally on said shaft and direct said driving pins progressively into and out of the driving portions of said first mentioned grooves.

18. A clutch comprising in combination a driven member, at least two driving members, an intermediate member having driving engagement with said driven member, and cam means for connecting said intermediate member and either of said driving members operable in accelerating, driving, and decelerating said shaft.

19. A clutch comprising in combination, a driven member, at least one driving member, a cam element intermediate said members having driving engagement with one thereof, and disengageable means on the other of said members for engaging said cam element in accelerating, driving, and decelerating movements.

20. A clutch comprising in combination, a driven member, at least two driving members, an intermediate member having driving engagement with said driven member, a pin and slot connection between said driving members and said intermediate member to provide driving connection therebetween, means for inserting said pins into said slots, and means for removing said pins therefrom.

21. A clutch comprising in combination, a driven member, at least two driving members, an intermediate member having driving engagement with said driven member, a pin and slot connection between said driving members and said intermediate member to provide driving connection therebetween, said slots having sloping bottoms to force said pins therefrom.

22. A clutch comprising in combination, a driven member, at least one driving member, a cam element intermediate said driven and said driving member, said element having permanent driving connection with one of said members and at least one cam groove shaped to define acceleration, drive, and deceleration portions, and means on the other of said members for engaging said cam groove to drive said last mentioned member.

23. A clutch comprising in combination, a driven shaft, a cam sleeve having driving connection with said shaft and longitudinal movement with respect thereto, said sleeve also having at least one cam groove on its outer surface shaped to transmit acceleration, drive, and deceleration movement, a cylindrical driving member surrounding said sleeve, and means on said driving member for engaging said cam groove to rotate said shaft in acceleration, drive, and deceleration movements.

24. A clutch comprising in combination, a driven shaft, a cam sleeve splined on said shaft having at least one cam groove on the outer surface thereof, a cylindrical driving member having a bearing portion on said shaft and a portion surrounding said sleeve, a pin in said driving member positioned to engage said cam groove, and means for engaging and disengaging said pin.

25. In a clutch of the character described having driving and driven members and cam engaging means in one of said members, means for transmitting motion therebetween comprising a cam element having permanent driving connection with one of said members and at least one cam groove positioned and shaped to receive said cam engaging means to transmit motion between said members.

26. A device as set forth in claim 25, wherein the cam engaging means includes a longitudinally movable pin receivable in said cam groove and wherein the cam groove is provided with a sloping bottom to force the pin from the groove.

27. In a clutch for driving the carriage of a tool, a driven shaft operatively connected to said carriage, at least one driving member concentric with said shaft, a cam sleeve splined to said shaft and having a plurality of cam grooves, a stationary member adjacent to said cam sleeve, cam pins in said stationary member and said driving member supported to move between retracted positions and projected positions engaging said cam grooves, said grooves being positioned and shaped to receive said cam pins to rotate said shaft in positive acceleration, drive, and deceleration movements, and means on said carriage for automatically inserting at least a portion of said cam pins in timed relation.

In witness of the foregoing I affix my signature.

JOHN NELSON.